United States Patent [19]
Deskins et al.

[11] Patent Number: 5,254,267
[45] Date of Patent: Oct. 19, 1993

[54] GREASE SEPARATING METHOD AND SEPARATOR SYSTEM

[76] Inventors: Paul A. Deskins, P.O. Box 1846, 106 Whitley Rd., Warner Robins, Ga. 31093; Charles T. Murray, 1214 Overton Dr., Box 93, Lawrenceville, Ga. 30245

[21] Appl. No.: 882,312

[22] Filed: May 12, 1992

[51] Int. Cl.⁵ .................................. B01D 17/00
[52] U.S. Cl. ............................... 210/799; 210/791; 210/792; 210/195.1; 210/257.1; 210/253; 210/207; 210/265; 210/538; 210/540; 210/286
[58] Field of Search ............... 210/791, 792, 266, 284, 210/799, 263, 269, 253, 275, 184, 185, 207, 532.1, 538, 540, 195.1, 265, 286, 257.1

[56] References Cited

U.S. PATENT DOCUMENTS

| | | | |
|---|---|---|---|
| 904,389 | 11/1908 | White | 210/265 |
| 2,588,794 | 3/1952 | Barton | 210/799 |
| 2,935,197 | 5/1960 | Marple | 210/187 |
| 3,107,601 | 10/1963 | Longmire | 99/330 |
| 3,540,593 | 11/1970 | Stewart | 210/266 |
| 3,554,906 | 1/1991 | Wolf | 210/284 |
| 3,925,202 | 12/1975 | Hirs | 210/275 |
| 4,113,617 | 9/1978 | Bereskin et al. | 210/299 |
| 4,274,960 | 6/1981 | Abrahamsson | 210/236 |
| 4,472,277 | 9/1984 | Bailey et al. | 210/238 |
| 4,940,539 | 7/1990 | Weber | 210/149 |
| 5,089,147 | 2/1992 | Ross | 210/793 |

*Primary Examiner*—Robert A. Dawson
*Assistant Examiner*—Ana M. Fortuna
*Attorney, Agent, or Firm*—Hopkins & Thomas

[57] ABSTRACT

A grease separation system includes a main grease separator tank [11] which has a plurality of filters [23] suspended along the upper portion of the tank above a bed of grease absorbing material [28]. A perforated pipe [31] extends the length of the floor of the tank and discharges into a grease trap [33]. An admixing tank [52] is also included for admixing a grease absorbing material [60] with the grease [24] collected within the filters and rendering the grease bladeable for disposal into a landfill.

18 Claims, 2 Drawing Sheets

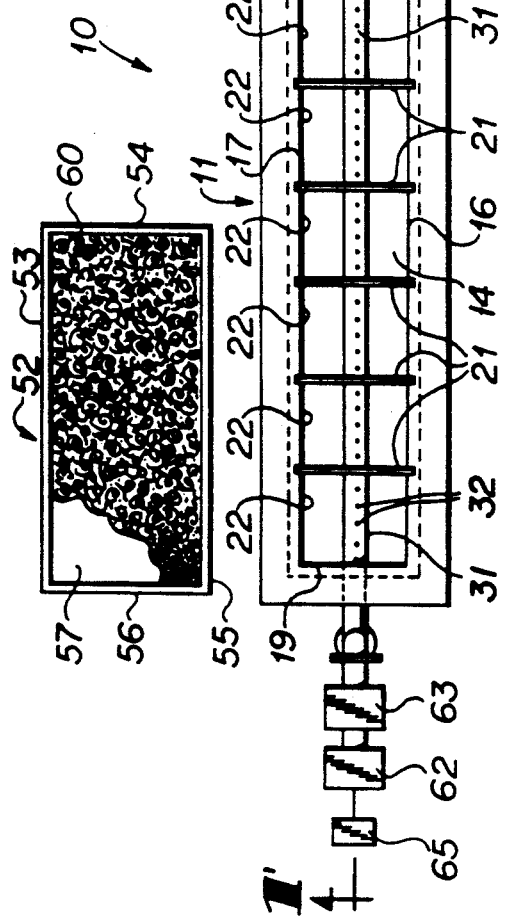
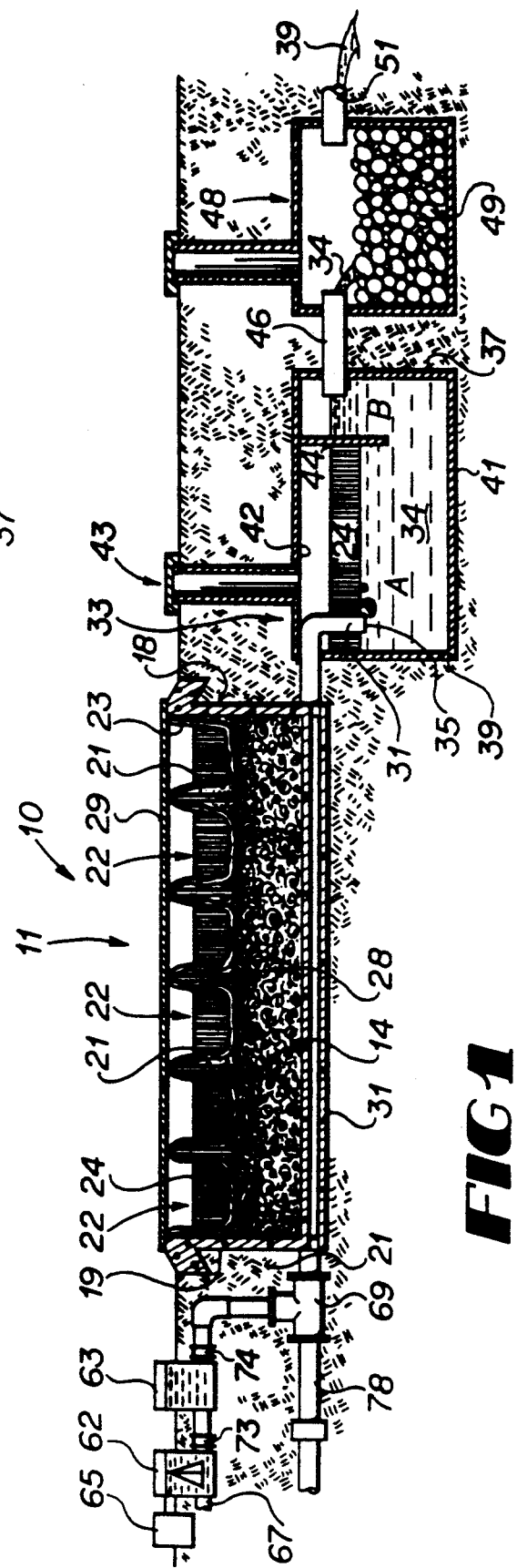

GREASE SEPARATING METHOD AND SEPARATOR SYSTEM

FIELD OF THE INVENTION

The present invention relates to a recovery system for reclaiming or separating fats, oils, greases and the like from wastewater.

BACKGROUND OF THE INVENTION

Wastewater from many commercial and industrial facilities, such as restaurants, usually contains large amounts of greasy wastes including fats, oils, waxes, and other high molecular-mass fatty acids. In wastewater treatment plants, these greasy wastes interfere with the proper operation of the treatment process. For example, grease has a tendency to coat the insides of the pipes and tank walls that are used to transport and store the sludge and scum from wastewater. Also, excessive quantities of grease may tend to plug the trickling filters or coat the biological floc that are used in the activated sludge processes of wastewater treatment plants. Consequently, in many states, restaurants and others who produce greasy wastewater are required by law to use on site grease traps to collect from the wastewater a major portion of the large amounts of greasy wastes that they produce.

Heretofore, the greasy waste collected within these grease traps has been disposed of in several different ways. It has been, for example, collected and transported to a municipal wastewater treatment plant and treated along with the influent wastewater, collected in large drums and recycled, collected and placed inside of containers to be disposed of in a landfill, or collected and dumped directly into a landfill Direct dumping of the greasy wastewater can, if it is liquid or in semi-liquid form, contaminate the water supply of a municipality. Because of the difficulty in the collection and disposition of greasy waste, more and more municipal wastewater treatment plants are refusing to accept greasy wastewater In addition, in some locales the size and quantity of the containers used to dispose of grease into landfills has been restricted by law, and the disposal of greasy wastewater directly into a landfill is prohibited by both federal and state laws.

However, some state regulations permit liquid wastes to be admixed with a bladeable material and deposited in a landfill. For example, a regulation of the Georgia Department of Natural Resources, Environmental Protection Division, provides that liquid waste, if admixed with a bladeable material to render it nonliquid, is acceptable for disposal at a landfill "Bladeable" is defined in the regulations as capable of being shovelled, scooped, or pushed by a "blade." It is, therefore, to a method and apparatus for extracting greasy waste from wastewater and admixing the wastes thus extracted with a bladeable material that the present invention is directed.

SUMMARY OF THE INVENTION

The present invention, in a preferred embodiment thereof, comprises a grease recovery system for processing wastewater containing large amounts of grease. The system includes a main grease separator tank wherein most of the grease is separated from the wastewater and allowed to dry. The main separator tank has a series of adjacent linearly disposed individual compartments defined by partitions or dividers along the upper part of the separator tank. Each compartment houses a filter, such as a nylon mesh canvas filter, which is suspended within the compartment. Beneath the partitions and the filters is a bed of a bladeable mass of discrete individual particles, such as wood chips, which rests above a perforated pipe that extends the length of the floor of the tank.

Greasy wastewater collected from, for example, restaurant grease traps by a vacuum truck is transported to the system and pumped into the filters, which trap the grease, while the filtrated wastewater passes through to the wood chips and down into the perforated pipe, the wood chips acting to occlude some of the grease remaining in the filtrated wastewater At the discharge end of the perforated pipe is located a conventional grease trap and a stone filter, which together separate any remaining residual grease from the twice-filtrated wastewater.

The system also includes a separate mixing tank positioned adjacent the main separator tank wherein the filters are transferred after substantially all of the wastewater has drained from the filters into the separator tank and the trapped grease remaining in the filters is substantially dry. In this mixing tank, the dry grease is dumped from the filters and mixed with an absorption material, such as wood chips, sawdust, or sand, present in sufficient quantity to make the resulting mixture "bladeable," so that it easily can be transported to, and disposed of in, a solid waste landfill.

The system also includes a filter wash tank and a filter rinse tank, both connected between the upstream end of the perforated pipe remote from the discharge end and a supply source of clean water. The purpose of the wash tank, rinse tank, and the clean water is to provide a means for cleaning the filters for reuse after the dried grease is removed therefrom.

Accordingly, it is an object of the present invention to provide an apparatus and process for separation of grease from greasy wastewater and for sufficient drying and solidification of the grease for disposal into a landfill Another object of the present invention is to provide an apparatus and process for recovering grease from wastewater so as to render greasy wastes bladeable for disposal into a landfill Still another object of the present invention is to provide municipalities an inexpensive yet efficient means for removing grease from waste water so as to prevent contamination of their water supply by liquid waste.

A further object of the present invention is to provide in solid waste handling, a means for complying with state and federal regulations controlling the disposal of grease into landfills.

Other objects, features, and advantages of the present invention will become apparent from the following specification, when read in conjunction with the accompanying drawings

BRIEF DESCRIPTION OF THE DRAWINGS

FIG. 1 is a vertical sectional view of the grease recovery system for wastewater constructed with the present invention taken substantially along line 1'—1' in FIG. 2;

FIG. 2 is a plan view of the grease recovery system of FIG. 1 with the filters and absorption material removed from the main separator tank and the grease and wastewater removed from the system for illustrating the structure of the components of the invention;

DETAILED DESCRIPTION

Figure 3:
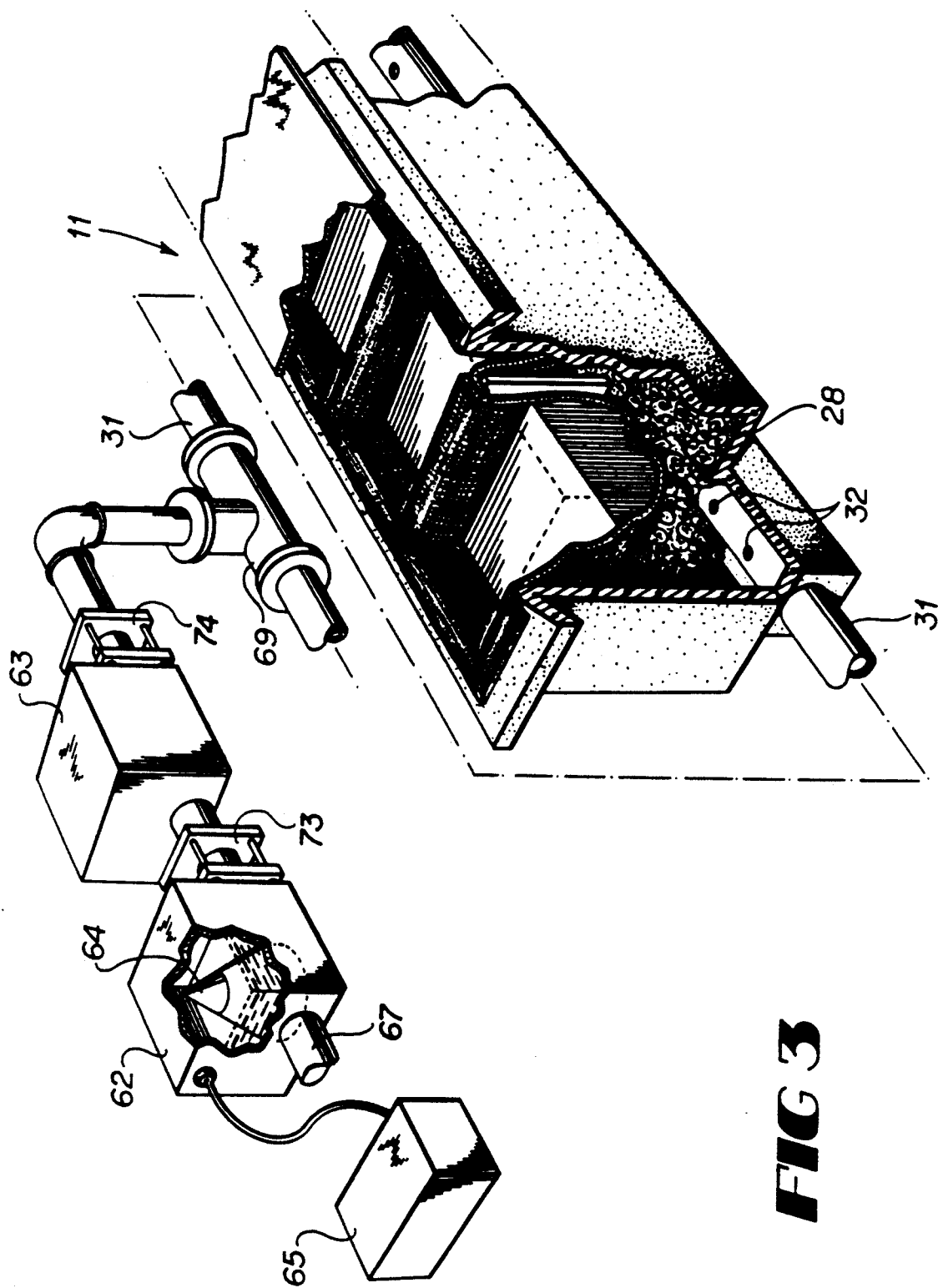
FIG. 3 is an exploded perspective view of the wash tank, rinse tank, and one end of the main separator tank, for the grease recovery system of FIG. 1, with a portion of the main separator tank removed for illustrating the perforated drain pipe below the bed of absorption material, and with a portion of the wash tank removed for illustrating the agitator, therein.

Referring now to the drawings, in which like numbers represent like parts throughout the several views, FIGS. 1 and 2 show a grease recovery system lo that embodies the principles of the present invention in a preferred form The system 10 includes a main grease separator tank 11 for filtering most of the fats, oils, waxes, and solid particles (hereinafter referred to as "grease") from greasy wastewater The main separator tank 11 is generally rectangular in shape and comprises a floor 14, side walls 16 and 17, and end walls 18 and 19. The walls and floor of the tank 11 are constructed of a material of suitable strength and durability, such as concrete, and preferably, the tank 11 is recessed within the ground 21 as shown in FIG. 1. The main separator tank 11 is generally open at the top but can be closed by suitable lids 29. The overall size of the separator tank 11 can be varied to accommodate the grease processing demands of a particular application.

Within the main separator tank 11 are dividers, or partitions 21, mounted transversely between the side walls 16, 17 and extending approximately halfway down into the tank 11. The partitions 21, preferably formed of metal, define individual compartments 22 for the upper part of the tank 11, and within each compartment 22 is positioned a filter 23 formed of material suitable for separating grease from water, such as double nylon mesh canvas filter material, which, when greasy wastewater is passed through it, can filter substantially all of the grease from the wastewater. The filters 23 are formed in a bag-like shape and are suspended within the compartments 22 with their upper edges draped over the top edges of the partitions 21 and the walls 16, 17, 18, and 19.

Below the filters 23 is a bladeable mass of discrete individual particles 28, such as clean wood chips, sawdust, or sand. The bladeable material 28 serves to occlude some of the residual grease 24 from the wastewater filtrate draining by gravity from the filters 23. When the bladeable material 28, over a period of time, becomes saturated with grease and solids, it easily can be manually removed, as a "bladeable" solid waste material, which can be disposed of into a landfill By use of the term "bladeable," it is meant that the material can be shovelled, scooped, or pushed by a "blade".

The bladeable material 28 fills the main separator tank 11 to a height sufficient to support the filters 23 from below Thus, when the filters 23 are filled with greasy wastewater, they conform to the shape of the compartments 22 and are supported laterally by the walls 16, 17, 18, and 19 and partitions 21 and from below by the bed of bladeable material 28 on which rest the bottom portion of the filters 23. Consequently, it is not necessary to secure the top edge portions of the filters 23 more firmly to the top edges of the walls 16, 17, 18, and 19 and partitions 21. This arrangement facilitates easy and quick removal of the filters 23 from the compartments 22. However, it should be understood that alternative arrangements are feasible wherein the filters are secured to the top edges of the walls 16, 17, 18, and 19, nor the filter 23 resting on the bed of adsorption material 28.

As best seen in FIG. 3, a perforated drain pipe 31 forms a conduit extending below the bladeable material 28 and along the floor 14 of tank 11. The top portion of the drain pipe 31 has spaced holes or perforations 32, through which the twice filtrated wastewater can pass. The drain pipe 31 is preferably sloped, from left to right, as shown in FIG. 1, and is formed of plastic material suitable for carrying wastewater, such as polyvinyl chloride (PVC) The slope of the drain pipe 31 allows the twice filtrated wastewater, which passes through bladeable material 28 into pipe 31, to drain by gravity into a conventional septic tank or grease trap 33, which forms at the discharge end 35 of the drain pipe 31. The size of the perforations 32 is less than the size of the particles of the bladeable material 28, which, in the case of wood chips, for example, is generally two to three inches in minimum length, to prevent the bladeable material 28 from washing down into the drain pipe 31. Thus, it can be seen that the drain pipe 31 functions as a conduit means for receiving the twice filtrated wastewater after it passes through the bladeable material 28.

In operation, liquid wastewater, comprising mainly grease and some solids is removed from grease traps (not shown) at, for example, restaurants, and fed into vacuum trucks (not shown) The trucks then transport the wastewater to a site adjacent to tank 11 where the wastewater is discharged from the truck over all of filters 23. Each filter 23 is separately filled with greasy wastewater until the level of the greasy wastewater within the filters 23 approaches the top edges of the partitions 21, at which point, the filling is stopped and the lid 29 above the compartment 22 is closed. Within the filters 23, most of the grease 24 and any other solid particles suspended in the wastewater are retained as the filter cake, while the remaining wastewater and some residual grease drain through the filters 23 and into the bed of bladeable material 28 disposed therebelow. The bladeable material 28 occludes some of this residual grease and solids from the filtrate, while the remainder of the wastewater filtrate drains by gravity into the drain pipe 31.

The grease trap 33 is usually buried in the ground, is generally rectangular in shape, and is formed with walls 36, 37, 38, and 39, a floor 41, and a top or lid 42. A manhole 43 extends up from the top 42 to provides access to the grease trap 33 A baffle 44 is mounted between sides 36 and 38 of the grease trap 33 and extends approximately halfway down into the trap 33, thereby defining two chambers A and B. Twice filtrated wastewater influent from drain pipe 31 flows into chamber A wherein any residual grease 24 rises to the surface of the wastewater 34, which is denser than the grease 24 within trap 33. The discharge end 35 of the drain pipe 31 extends downwardly into the wastewater 34 in chamber A a sufficient distance to allow the wastewater from drain pipe 31 to mix initially with the wastewater 34 below grease 24 within trap 33, rather than the grease 24. In chamber A, the flow of the wastewater 34 slows to a quiescent state allowing the grease 24 sufficient time to separate from the wastewater 34. Baffle 44 serves to contain the grease 24 in chamber A while allowing only the wastewater 34 to flow into chamber B. The separated grease 24 within chamber A can readily be pumped from the grease trap 33 through the manhole 43 and back into the filters 23 for further processing, thus allowing the system 10 to process substantially all of the greasy wastes introduced into the system. It should be understood to those skilled in the art that grease trap 33 is designed in a conventional manner and does not, by itself, constitute the present invention. Those skilled in the art also will understand that many variations and substitutions may be made in the design of the grease trap to accomplish the same result, discussed herein.

From chamber B, the effluent wastewater 34 drains through a connection pipe 46 into a stone filter tank 48. Within stone filter tank 48, the wastewater 34 goes through a final trickling filtration process before being directed to either a municipal treatment plant or an absorption field, depending on the application. Stone filter tank 48 is generally rectangular in shape and is filled with aggregate, for example, stones 49, or similar material, such as gravel. After discharge of the wastewater from pipe 46 above the stones 49, the wastewater 34 is allowed to filter slowly through the bed of stones 49, which captures most of any suspended particles remaining in the wastewater and allows a rapid reduction in organic matter content of the wastewater to occur, thereby further purifying the wastewater 34. After it passes through the stones 49, the wastewater 34 flows out of filter tank 48 through discharge pipe 51 to a connection pipe (not shown), which leads either to a municipal treatment plant, to an absorption field or to where it can be collected for transport to a water treatment plant.

In the main separator tank 11, after most of the wastewater 34 has drained through the filters 23, it is desirable to admix the filter cake grease 24 captured in the filters 23 with a bladeable material, such as wood chips, sawdust, or sand, that will render the grease mixture bladeable prior to transporting the grease 24 to a solid waste landfill site For this purpose, a receptacle or final drain tank 52 is positioned adjacent to the separator tank 11. The tank 52 is generally rectangular in shape and has side walls 53, 54, 55, and 56 and a floor 57. Bladeable material 60, like bladeable material 28 within the main separator tank 11, is contained within the tank After the grease 24 has sufficiently dried and solidified within filters 23, it is an essentially dry condition The filters 23 are then lifted from the main separator tank 11 by their top edges using a backhoe (not shown) The grease 24 is then dumped from the filters 23 onto the bladeable material 60 in a truck (not shown) and transported to and disposed of in a landfill. Alternatively, the solidified grease 24 can be sold or otherwise recycled.

In order to render the grease in filters 23 suitable for disposal into a landfill, it must be a solid waste, or, more specifically, a "nonliquid" as provided by state and federal regulations. A common test for determining the presence of liquids in a sample waste is Method 9095—"Paint Filter Liquids Test," as described in "Test Methods for the Evaluation of Solid Wastes, Physical/Chemical Methods" (EPA Pub. No. SW-846). In this test, a predetermined amount of material is placed in a paint filter, and if any portion of the material passes through and drops from the filter within a five-minute test period, the material is deemed to contain free liquids, and thus is not considered a "nonliquid." The present invention incorporates a means for complying with such a test.

To assure dry grease, the filters 23 which receive the grease are usually kept within the main separator tank 11 for a sufficient time, then lifted by their edges from compartments 22 and suspended thereabove until a five minute period passes during which no wastewater drips from the filters 23. Typically, this will occur within twenty-four hours of initially pumping the greasy wastewater into the filters 23.

Once the grease is dumped from the filters into the absorption material in the truck, it is ready for disposal in a solid waste landfill site. The filters 23 are then washed and reused. For this purpose, a wash tank 62 and a rinse tank 63 are positioned adjacent the separator tank 11. The wash tank 62, shown schematically in FIG. 1, includes an agitator 64 and a motor 65 for actuating the agitator 64. Both the wash tank 62 and the rinse tank 63 are respectively connected to a water supply line 67, which may discharge into drain pipe 31 at junction 69. Valves 73 and 74 control the flow of water into and out of wash tank 62.

The rinse tank 63 is positioned downstream of the wash tank 62. In operation, the wash tank 62 and rinse tank 63 are filled with water, a used filter 23 placed into the wash tank 62, and the agitator 64 activated by motor 65 for a period of time Afterwards, valves 73 and 74 are opened, allowing the greasy rinse water to drain into the water supply line 67, through junction 69, through drain pipe 31, and eventually into grease trap 33.

After a filter has been washed in wash tank 62, it is then placed into rinse tank 63 for further rinsing. After the filter 23 has been rinsed, valve 73 is closed and valve 74 is opened, allowing the rinse water to drain into drain pipe 31 and eventually into grease trap 33. After being washed, the cleaned filter 23 is repositioned within a compartment 22 to be reused. Thus, it can be seen that the system 10 provides a means for removing the grease that adheres to the filters 23 and is subsequently washed therefrom, which, as previously stated, allows the system 10 to remove substantially all of the grease from the greasy wastewater.

As shown in FIG. 1, a clean-out plug connection pipe 78 is connected at one of its ends to pipe junction 69 and at its other end to a manhole (not shown). The manhole and the connection pipe 78 function as an access means to drain pipe 31 for cleaning out and freeing debris that may become trapped therein For example, a clean out plug, such as an eel or a snake, can be inserted into the manhole cover and through the connection pipe 78 into the drain pipe 31 for the purpose of cleaning out the drain pope 31.

Thus, it can be seen that a means is provided for quickly and efficiently separating grease from greasy wastewater and admixing it with an absorption material to render the grease bladeable, and thus suitable for disposal into a landfill. Consequently, a means is provided for processing the large amounts of greasy wastewater produced by restaurants, and similar establishments, that is environmentally safe and complies with state and federal regulation.

It will be understood that the foregoing relates only to a preferred embodiment of the present invention, and that numerous changes and modifications may be made therein without departing from the spirit and scope of the invention as set forth in the following claims.

We claim:
1. A grease recovery system, comprising:
(a) a main separator tank for recovering grease and solids from wastewater, said main separator tank having a bottom and side wall extending from said bottom for defining an open interior with an upwardly open top, said open interior having an upper portion and a lower portion;

(b) a bladeable mass of discrete individual particles disposed in said lower portion;

(c) a removable, upwardly opening, flexible water pervious filter means carried within said upper portion, said filter means covering at least a portion of said bladeable material and having an upper open mouth portion adjacent to the open top of said main tank;

(d) support means for supporting said filter means for receiving wastewater poured into the mouth of said filter means so that said grease and solids are retained in said filter and a filtrate passes by gravity from said filter, said bladeable material functioning as a secondary filter for filtering the filtrate to retain residual grease and solids that pass through said filter means; and (e) means for directing the filtered filtrate from said lower portion.

2. A grease recovery system, comprising, (a) a main separator tank for recovering grease and solids from wastewater, said main separator tank having a bottom and side wall extending from said bottom for defining an open interior with an upwardly open top, said open interior having an upper portion and lower portion;

(b) a bladeable mass of discrete individual particles disposed in said lower portion;

(c) a removable, upwardly opening, flexible water pervious filter means carried within said upper portion, said filter means covering at least a portion of said bladeable material and having an upper open mount portion adjacent to the open top of said main tank;

(d) support means for supporting said filter means for receiving wastewater poured into the mouth of said filter means so that said grease and solids are retained in said filter and a filtrate passes by gravity from said filter, said bladeable material functioning as a secondary filter for filtering the filtrate to retain residual grease and solids that pass through said filter means;

(e) means for directing the filtered filtrate from said lower portion; and (f) said filter means comprising a plurality of filters disposed along the upper portion of said main separator tank and wherein said support means comprises a plurality of partitions disposed in spaced relationship to each other along the upper portion of said main separator tank for defining a plurality of individual compartments, each filter adapted for placement with a compartment.

3. The apparatus of claim 2, wherein said support means further comprises placement of said bed of discrete individual particles within the lower portion of said main separator tank contiguous to the compartments of the upper portion so that said bed supports said filter from below said filters.

4. A grease recovery system, comprising, (a) a main separator tank for recovering grease and solids from wastewater, said main separator tank having a bottom and side wall extending from said bottom for defining an open interior with an upwardly open top, said open interior having an upper portion and lower portion;

(b) a bladeable mass of discrete individual particles disposed in said lower portion;

(c) a removable, upwardly opening, flexible water pervious filter means carried within said upper portion, said filter means covering at least a portion of said bladeable material and having an upper open mount portion adjacent to the open top of said main tank;

(d) support means for supporting said filter means for receiving wastewater poured into the mouth of said filter means so that said grease and solids are retained in said filter and a filtrate passes by gravity from said filter, said bladeable material functioning as a secondary filter for filtering the filtrate to retain residual grease and solids that pass through said filter means;

(e) means for directing the filtered filtrate from said lower portion; and (f) said filter means being positioned above said bed of discrete individual particles, and said bed of discrete individual particles being positioned above said means for directing the filtered filtrate, whereby gravity forces wastewater poured into said filter means therethrough into said bed of discrete individual particles and into said means for directing the filtered filtrate.

5. A grease recovery system, for recovering grease from wastewater comprising:

(a) a main separator tank having a bottom and upstanding walls extending upwardly from said bottom for forming an upright vessel with an open interior defining an upper chamber and a lower chamber and an open top;

(b) a plurality of partitions disposed in spaced relationship to each other adjacent to said top and across said upper chamber for defining a plurality of individual juxtaposed compartments, all of which communicate with said lower chamber;

(c) a plurality of individual removable filters received respectively in said compartments;

(d) a bed of discrete absorbent particles in said lower chamber and extending beneath all of said filters, said bed having an upper surface, the lower portions of said filters normally resting upon said upper surface so that said absorbent particles in said lower chamber provide support for the lower portions of said filters and act as a secondary support means for said filters; and (e) removal means for removing wastewater from said bed of discrete absorbent particles, whereby, greasy wastewater poured into said compartments is filtered by said filters, which retain grease therein allowing filtrated wastewater to pass into said bed of discrete absorbent particles, wherein residual grease in said filtrated wastewater is absorbed by said bed of discrete absorbent particles while the filtrated wastewater passes through said removal means.

6. A grease recovery system for separating grease and solid particles from a liquid, said system comprising;

a separator tank;

filter means positioned in operative relationship to said separator tank for filtering and retaining grease from said liquid and for permitting the liquid to be received in said tank as a filtrate;

absorption means within said separator tank for contacting said filtrate for adsorbing residual grease and solids from the treated filtrate and for retaining the residual grease and solids in said tank as said filtrate passes therethrough;

conduit means communicating with said tank for receiving said filtrate after it passes through said adsorption means;

grease trap means for receiving the filtrate from said conduit means for further separating additional grease and solid particles from the filtrate; and a receptacle for receiving the grease retained by said filter means, said receptacle containing a grease adsorbing material.

7. The apparatus of claim 6 wherein said filter means comprises a filter having a bottom and at least one side defining a liquid receiving space for receiving an amount of the liquid, said filter being adapted to trap and retain the grease and solid particles contained in the liquid and allow the liquid to drain therethrough 8. The apparatus of claim 6 wherein said absorption means comprises grease absorbing material positioned below said filter means and above said conduit means, whereby when the liquid is poured into said filter means, the liquid is forced by gravity through said filter means, said absorption means, and said conduit means.

9. The apparatus of claim 6 further comprising a cleaning means for Washing said filter.

10. The apparatus of claim 9 wherein said cleaning means comprising means for receiving water, means for washing the filter with the water, and means for disposing of the water into said conduit means.

11. The apparatus of claim 6 further comprising a stone filter for receiving liquid from said means for passing liquid from said receiving means and further filtering the liquid.

12. The apparatus of claim 6 further comprising an access means for providing access to said conduit means in order that said conduit means can be cleaned.

13. A method for separating grease and solid particles from wastewater comprising the steps of:

filtering the wastewater through a filter means transversely disposed in a tank, the filter means being removably supported on its sides and from below;

passing the filtrated wastewater through a bed of discrete individual particles that occlude any residual grease from the filtrated wastewater, said particles providing support from below; and passing the filtrated wastewater from the bed of discrete individual particles to a conduit means.

14. A method for separating grease and solid particles from a liquid comprising the steps of:

filtering the liquid through a filter means positioned within a separator tank so that substantially all of the grease and solid particles are retained by said filter means;

passing the filtered liquid in a prescribed path through an absorption means wherein some residual grease and residual solid particles are absorbed by the absorption means from the filtered liquid;

collecting the filtered liquid in a conduit means after it passes through the absorption means;

passing the collected filtered liquid from the conduit means into a separating means for separating additional residual grease and additional residual solid particles from the collected filtered liquid; and removing and mixing the grease and solid particles from the filter means with a grease absorbing material.

15. The method of claim 14 further comprising the step of retrieving the grease separated in the separator means and transferring it into the filter means.

16. The method of claim 14 further comprising the step of washing the filter means with water after the grease collected therein has been mixed with the grease absorbing material.

17. The method of claim 16 further comprising the step of disposing of the water used to wash the filters into the conduit means.

18. The method of claim 14 further comprising the step of passing the filtered liquid through a stone filter means for separating solid particles from the liquid.

* * * * *